United States Patent
Shum et al.

(10) Patent No.: US 9,004,704 B1
(45) Date of Patent: Apr. 14, 2015

(54) ELECTRONIC FLASH DEVICE

(71) Applicant: Nissin Industries Ltd., Hong Kong (CN)

(72) Inventors: Tak Wah Shum, North Point (CN); Han Wu He, North Point (CN)

(73) Assignee: Nissin Industries Ltd., Hong Kong (CN)

( * ) Notice: Subject to any disclaimer, the term of this patent is extended or adjusted under 35 U.S.C. 154(b) by 0 days.

(21) Appl. No.: 14/036,052

(22) Filed: Sep. 25, 2013

(51) Int. Cl.
*G03B 15/02* (2006.01)
*G03B 15/05* (2006.01)

(52) U.S. Cl.
CPC ........................................ *G03B 15/05* (2013.01)

(58) Field of Classification Search
CPC ........................................................ G03B 5/02
USPC ....................... 362/3, 11, 16; 396/4, 155, 165
See application file for complete search history.

(56) References Cited

U.S. PATENT DOCUMENTS

| | | | |
|---|---|---|---|
| 4,176,930 A * | 12/1979 | Imura | 396/61 |
| 4,276,579 A * | 6/1981 | Yako | 362/5 |
| 4,678,160 A * | 7/1987 | Yamada et al. | 251/129.02 |
| 5,040,007 A * | 8/1991 | Hagiuda | 396/155 |
| 5,666,571 A * | 9/1997 | Matsumura | 396/165 |
| 5,828,910 A * | 10/1998 | Lawther et al. | 396/178 |
| 5,848,302 A * | 12/1998 | Machida | 396/60 |
| 5,878,291 A * | 3/1999 | Hagiuda et al. | 396/175 |
| 6,351,058 B1 * | 2/2002 | Roberts | 313/113 |

FOREIGN PATENT DOCUMENTS

JP    2003084340 A    3/2003

* cited by examiner

*Primary Examiner* — Ali Alavi
(74) *Attorney, Agent, or Firm* — Dority & Manning, P.A.

(57) ABSTRACT

An electronic flash device which is protected from thermally damaging a lamp holder (30) supporting a flash tube (40) even when the flash tube is lighted in a consecutive manner for a prolonged period of time. The lamp holder is made of ceramic material. The flash tube is supported by the lamp holder via a tube mounting member (44) which includes a wavy central part (44A) extending laterally along a back side of the lamp holder and a pair of annular parts (44B) fitted on either axial end of the flash tube such that the flash tube is resiliently urged against a bottom part of a concave mirror (42) received in the lamp holder.

6 Claims, 5 Drawing Sheets

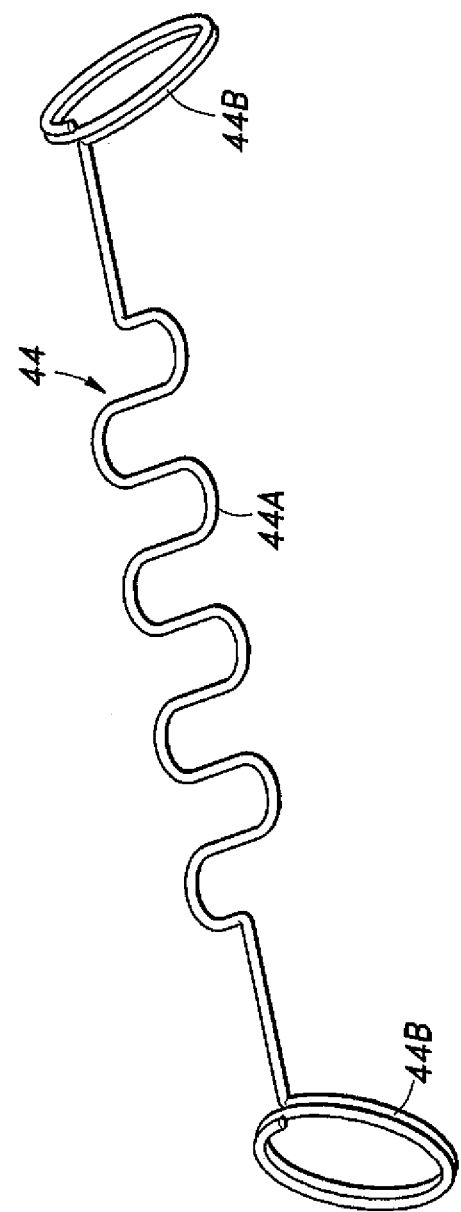

ELECTRONIC FLASH DEVICE

TECHNICAL FIELD

The present invention relates to an electronic flash device, and in particular to an electronic flash device suitable for use with a zoom lens camera.

BACKGROUND OF THE INVENTION

In an electronic flash device suitable for use with a zoom lens camera, it was proposed to place a flash tube such as a xenon discharge flash tube in a lamp holder which is disposed in a housing so as to be moveable in the fore and aft direction. As the fore and aft movement of the lamp holder causes the distance between the flash tube and a fresnel lens placed in front of the lamp holder to change, the beam angle (or the cone angle) of the flash light that is produced from the electronic flash device changes. The movement of the lamp holder may be coordinated with the movement of the zoom lens of the camera such that the beam angle of the flash light corresponds to the field of view of the camera. See JP2003-84340.

As the lamp holders for the conventional electronic flash devices are typically made of plastic material such as polyacrylate, the repeated lighting of the flash tube could cause thermal damage (such as permanent deformation) to the lamp holder although the duration of each light emission is extremely short if the flash tube is lighted at a high frequency for a prolonged period of time. Therefore, conventionally, powerful electronic flash devices are sometimes provided with a protection circuit for limiting the repeated lighting of the flash tube within a prescribed number of times during a prescribed period of time. However, this is found to be highly inconvenient for professional cameramen who require continuous use of the electronic flash device for a prolonged period of time.

In particular, when a metallic concave mirror provided on the lamp holder is contemplated to be used as a trigger electrode for the xenon discharge flash tube and is therefore brought into contact with the xenon flash tube, the heat conduction from the flash tube to the metallic concave mirror or the lamp holder will be so intense that the risk of thermally damaging the lamp holder increases.

BRIEF SUMMARY OF THE INVENTION

In view of such problems of the prior art, a primary object of the present invention is to provide an electronic flash device which can prevent thermal damage to a lamp holder supporting a flash tube.

A second object of the present invention is to provide an electronic flash device which uses a concave mirror thereof as a trigger electrode without suffering from the problem of thermally damaging the lamp holder.

A third object of the present invention is to provide an electronic flash device which is capable of lighting the flash tube repeatedly for a prolonged period of time without compromising the durability of the electronic flash device.

According to the present invention, such objects of the present invention can be accomplished by providing an electronic flash device, comprising; a housing (18) having a front opening; a lens (24) fitted in the front opening of the housing; a guide member (26) extending in a fore and aft direction in the housing; a lamp holder (30) guided by the guide member for a fore and aft movement; an actuating mechanism (32, 34, 36) for moving the lamp holder in the fore and aft direction along the guide member; a flash tube (40) supported by the lamp holder; and a concave mirror (42 mounted on the lamp holder to reflect flash light emitted from the flash tube and pass light reflected thereby through the lens; wherein the lamp holder is made of ceramic material.

Because the lamp holder is made of ceramic material, even when the flash tube is activated in a consecutive manner over an elongated period of time, the lamp holder is prevented from being damaged or degraded by the heat of the flash tube so that the convenience of the electronic flash device is enhanced, and the durability of the electronic flash device is increased.

Typically, the flash tube consists of a xenon discharge flash tube, and the concave mirror is made of metallic material, the concave mirror being configured as a trigger electrode for the xenon discharge flash tube.

Thereby, the concave mirror not only serves as a trigger electrode for enabling the flash tube to operate in a stable manner but also as a heat dissipator so that the durability of the flash tube may be improved.

Preferably, the guide member is made of electrically insulating material such as ceramic material. Thereby, the lamp holder can be guided in a smooth manner without running the risk of causing a short-circuiting. Furthermore, the durability of the cooperating parts of the lamp holder and the guide member is enhanced.

According to a particularly preferred embodiment of the present invention, the flash tube is supported by the lamp holder via a tube mounting member (44) which includes a wavy central part (44A) extending laterally along a back side of the lamp holder and a pair of annular parts (44B) fitted on either axial end of the flash tube such that the flash tube is resiliently urged against a bottom part of the concave mirror.

Thereby, the flash tube can be supported on the lamp holder in a stable manner owing to the resilient force of the tube mounting member which is simple in structure and easy to assemble. Also, the tube mounting member may be made of a metallic wire member which is resistant to heat. Also, one of the annular parts may be configured as an additional trigger electrode for an improved performance of the flash tube.

To achieve an overall heat resistant structure, the lens may consist of a fresnel lens made of glass material.

BRIEF DESCRIPTION OF THE DRAWINGS

Now the present invention is described in the following with reference to the appended drawings, in which:

FIG. 5 is an enlarged perspective view of a tube mounting member used in the electronic flash device.

DETAILED DESCRIPTION OF THE PREFERRED EMBODIMENT(S)

Figure 1:
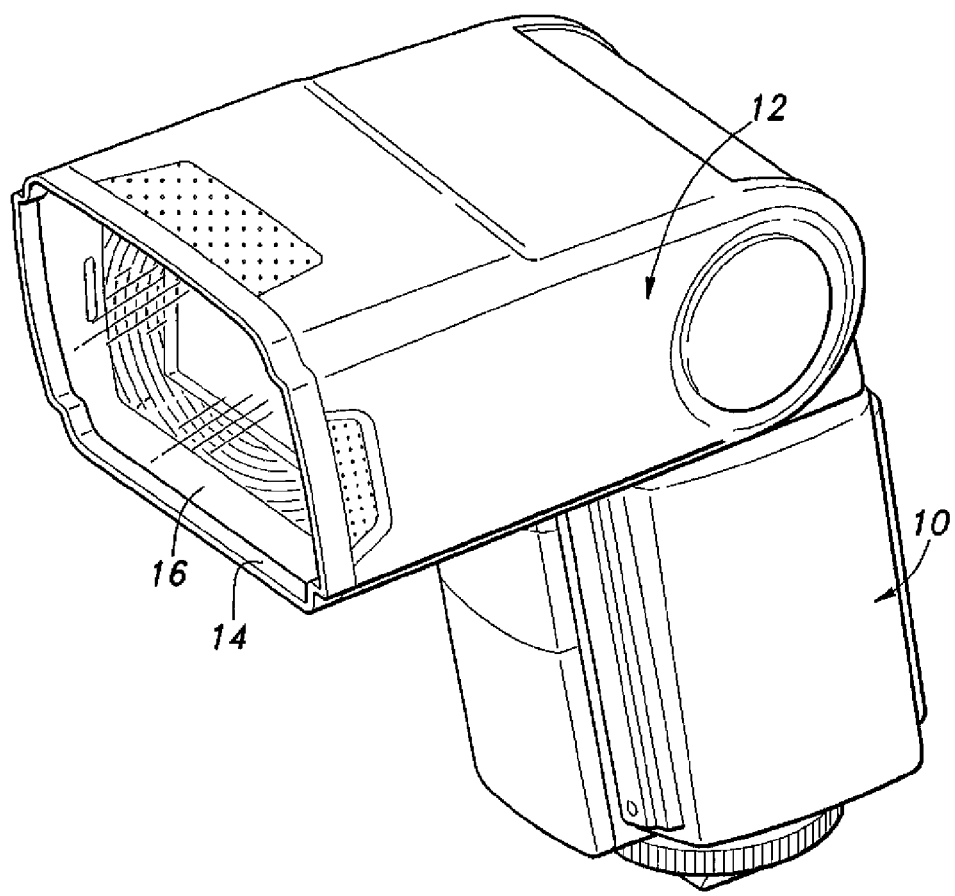
FIG. 1 is a perspective view showing an external appearance of an electronic flash device given as a preferred embodiment of the present invention.

An electronic flash device shown in FIG. 1 is provided with an electric outer case 10 made of plastic material, and accommodating therein a battery, a capacitor, an electronic circuit board and other components of the electronic flash device, and an optical outer case 12 made of plastic material and connected to the upper end of the electric outer case 10 so as to be pivotable around a horizontal lateral axial line. The electric outer case 10 is also provided with a mounting shoe in a lower end thereof which is configured to fit into a corresponding receptacle provided on the camera to support the electronic flash device thereon.

The optical outer case 12 is provided with a rectangular front window 14 which is closed by a front shield plate 16 made of transparent acrylic plastic material.

Figure 2:
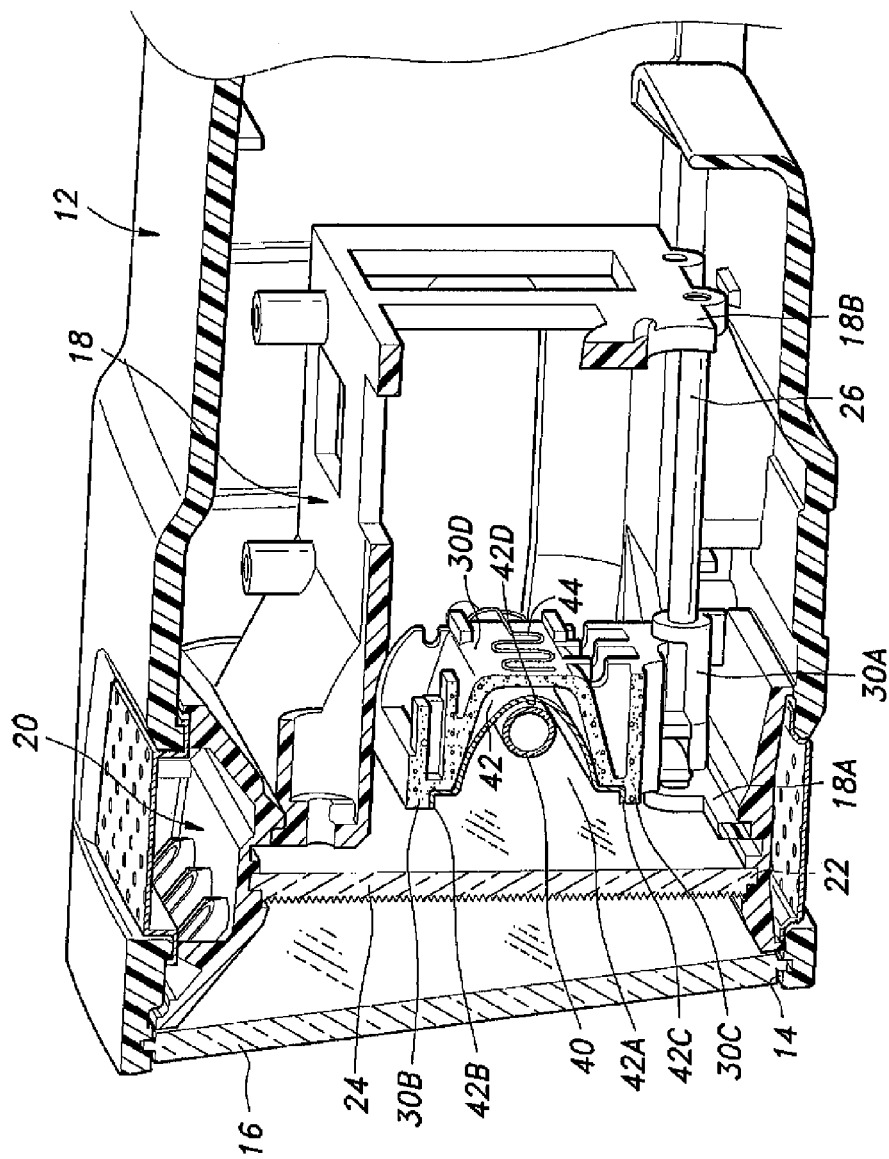
FIG. 2 is a perspective sectional view showing the interior of the electronic flash device of the first embodiment.

As shown in FIG. 2, a lens support member 20 is fixedly attached to the inner wall of the optical outer case 12, and is provided with a front opening which supports a fresnel lens 24 immediately behind the front shield plate 16. An inner housing 18 having a front opening is fixedly supported within the optical outer case 12 immediately behind the lens support member 20. The inner housing 18 and the lens support member 20 are both made of heat resistant plastic material such as heat-resistant polyamide resin, heat resistant epoxy resin, heat resistant polyamide-imide resin, heat resistant polyetheretherketone resin and potassium titanate fiber reinforced plastics.

The lens support member 20 is shaped as a rectangular frame, defining a rectangular opening 22 which is closed by the fresnel lens 24 which is made of molded heat resistant glass.

Figure 3:
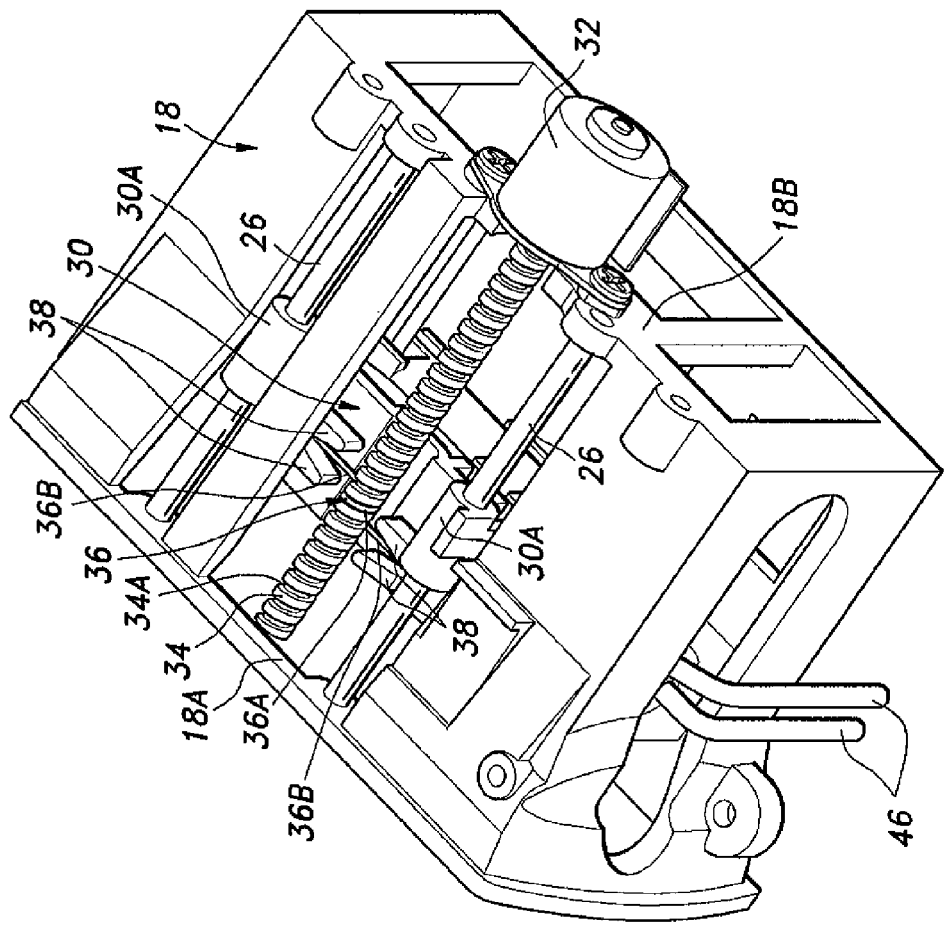
FIG. 3 is a bottom perspective view of an inner housing of the electronic flash device.

As shown in FIG. 3, the inner housing 18 is provided with a pair of guide rods 26 extending in the fore and aft direction in a mutually parallel relationship. The guide rods 26 may be made of ceramic material such as zirconia, and are each fixedly attached to a front wall 18A and a rear wall 18B of the inner housing 18 at the front and rear ends thereof, respectively.

A lamp holder 30 is integrally provided with a pair of sleeves 30A each extending in the fore and aft direction in a lower part thereof and slidably engaged by the corresponding guide rod 26 so as to allow the lamp holder 30 to be moved in the fore and aft direction inside the inner housing 18. The lamp holder 30 is provided with a trough shape extending laterally and defines a front opening 42A facing forward.

An electric motor (servo motor) 32 is attached centrally to a lower part of the rear wall 18B of the inner housing 18, and is provided with an output shaft connected to a base end of a lead screw rod 34 extending in the forward direction. The lead screw rod 34 is formed with a screw thread 34A thereon, and may be made of heat resistant plastic material such as heat-resistant polyamide resin, heat resistant epoxy resin, heat resistant polyamide-imide resin, heat resistant polyetheretherketone resin and potassium titanate fiber reinforced plastics.

A wire member 36 is mounted on the bottom wall of the lamp holder 30. The wire member 36 includes a central coil 36A consisting of about two turns of the wire material of the wire member 36 wrapped around the screw thread 34A of the lead screw rod 34, and a pair of linear sections 36B extending laterally from either end of the central coil 36A. The two terminal ends of the linear sections 36B of the wire member 36 are each securely fitted into a slot defined between a pair of projections 38 protruding from the bottom wall of the inner housing 18.

The wire member 36 may be made of resilient material such as spring steel, stainless steel and phosphor bronze. The central coil 36A of the wire member 36 is threadably engaged by the lead screw rod 34.

Therefore, when the lead screw rod 34 is turned around the central axial line thereof by the electric motor 32, the lamp holder 30 is caused to move in the fore and aft direction in a corresponding manner. The resiliency of the wire member 36 is highly effective in absorbing vibrations and noises that may be otherwise caused by the operation of the lead screw rod 34 and the electric motor 32.

As shown in FIG. 2, the lamp holder 30 is provided with a concave mirror 42 and a xenon discharge flash tube 40. The concave mirror 42 is made by stamp forming sheet metal made of such materials as aluminum, stainless steel and plated steel plate which are suitable for providing a highly reflective surface, and is shaped so as to conform to the inner surface of the trough shaped lamp holder 30 which is approximately semi-cylindrical in shape. Preferably, the concave mirror 42 is provided with a parabolic reflective surface directed forward. The concave mirror 42 is attached to the lamp holder 30 by attaching the upper and lower edges 42B and 42C thereof to the corresponding edge parts 30B and 30C of the lamp holder 30 surrounding the front opening thereof. The concave mirror 42 mounted on the lamp holder 30 is thus configured to reflect flash light emitted from the flash tube 40 and pass the reflected light through the fresnel lens 24 out of the electronic flash device.

Figure 4:
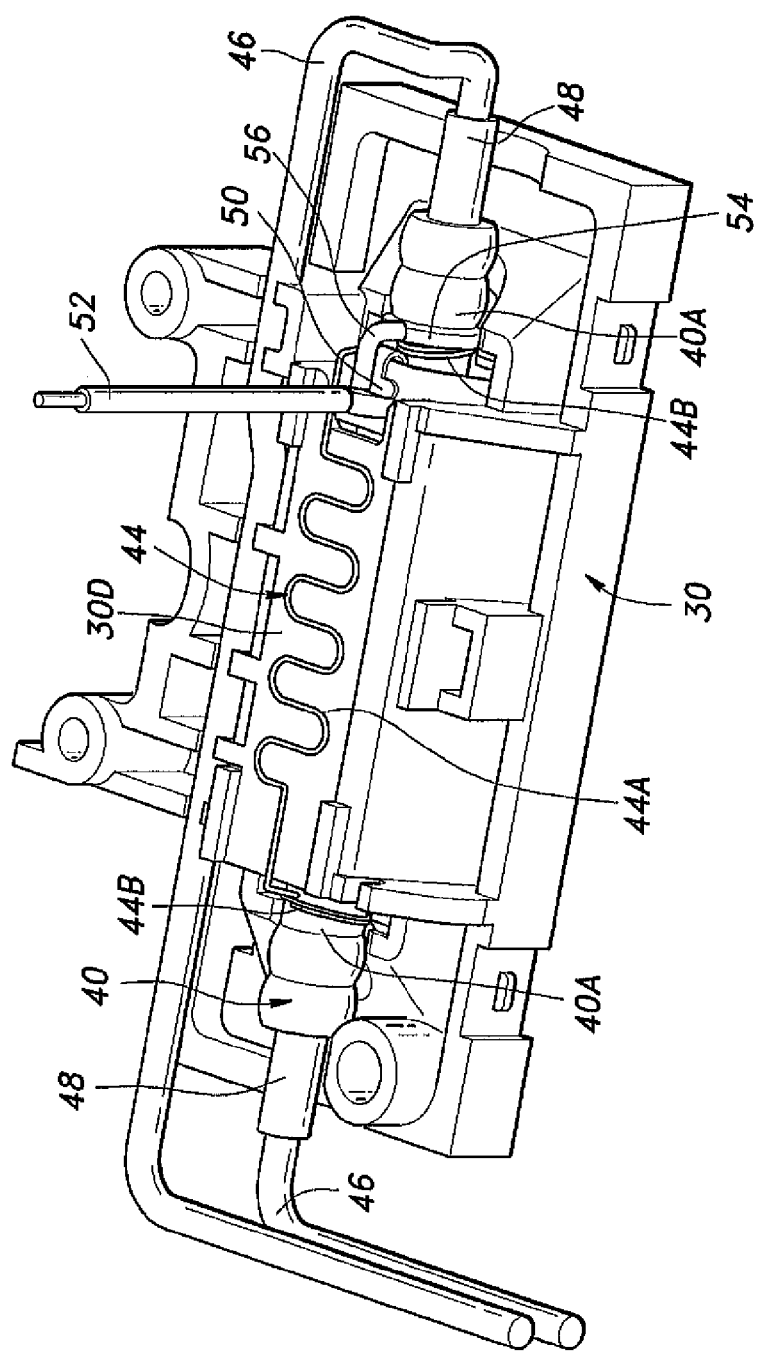
FIG. 4 is a rear perspective view of a lamp holder of the electronic flash device.

The xenon discharge flash tube 40 is packaged in a quartz glass tube, and is fixedly attached to the lamp holder 30 by using a tube mounting member 44 as shown in FIG. 4. The tube mounting member 44 is made of a wire member, and includes a wavy middle part 44A extending laterally along the backside 30D of the lamp holder 30 and a pair of terminal annular parts 44B connected to either end of the wavy middle part 44A via a short length of a linear part. Each annular part 44B consists of about two turns of the wire member, and is slightly bent toward a plane perpendicular to the axial line of the tube mounting member 44. Each annular part 44B is configured to be fitted on the quartz glass tube part on the corresponding end 40A of the xenon discharge flash tube 40 which extends out of the lamp holder 30. The lamp holder 30 may entirely consist of an elastic metallic wire made of such material as spring steel, stainless steel and phosphor bronze.

As best shown in FIG. 5, in the free state of the tube mounting member 44, each annular part 44B (in particular, the major plane thereof) is bent slightly toward a direction perpendicular to the major plane of the wavy middle part 44A or the plane in which the wavy middle part 44A extends. Therefore, when each annular part 44B is fitted on the corresponding end of the xenon discharge flash tube 40 while the wavy middle part 44A is flatly placed on the back side 30D of the lamp holder 30 against the spring force of the tube mounting member 44, the xenon discharge flash tube 40 is resiliently pushed onto a bottom end 42D of the concave mirror 42 (see FIG. 2) under the spring force of the tube mounting member 44 so that the xenon discharge flash tube 40 is kept fixed in position.

As the tube mounting member 44 is made of a metallic wire which is resistant to thermal damage or thermal degradation, the xenon discharge flash tube 40 is kept fixed in position in a stable manner even under a high temperature environment. As the wavy middle part 44A flatly abuts on the back side 30D of the lamp holder 30 by the major plane thereof, the tube mounting member 44 is effectively prevented from tilting in the vertical direction (around a lateral axial line). For this reason, by being retained by the annular parts 44B of the tube mounting member 44, the xenon discharge flash tube 40 is kept resiliently pushed against the bottom part 42D of the concave mirror 42 and thereby kept fixed relative to the lamp holder 30 even when the optical outer case 12 is subjected to a high acceleration condition.

As shown in FIG. 4, the xenon discharge flash tube 40 essentially consists of a quartz glass tube having a pair of bases made of copper or other highly electro-conductive material fixedly attached to either axial end of the quartz glass tube and connected to corresponding internal electrodes. Discharge lead wires 46 are electrically connected to the corresponding bases by copper sleeves 48 crimped thereonto. The concave mirror 42 is integrally formed with a trigger electrode terminal 50 to which a trigger electrode lead wire 52 is connected so that the concave mirror 42 serves as a trigger electrode extending along the length of the xenon discharge flash tube 40 to assist the electric discharge in the xenon discharge flash tube 40 to be performed in a stable manner.

An auxiliary trigger electrode 54 is formed around a terminal end part of the quartz glass tube by depositing electroconductive paste such as silver paste thereon. The auxiliary trigger electrode 54 is connected to the trigger electrode terminal 50 via an auxiliary trigger electrode lead wire 56. The connection between the auxiliary trigger electrode lead wire 56 and the trigger electrode lead wire 52 is also made by the crimping of a copper sleeve. The auxiliary trigger electrode 54 is in contact with the corresponding annular part 44B of the tube mounting member 44 so that the annular part 44B also serves as a part of the auxiliary trigger electrode 54. The use of the auxiliary trigger electrode 54 promotes the electric discharge to be performed in an even more stable manner.

In the illustrated embodiment, the lamp holder 30 is made of ceramic material so that an improved thermal resistance may be attained as compared to that made of plastic material. Therefore, even when the xenon discharge flash tube 40 is consecutively activated for a prolonged period of time, and the resulting heat has raised the temperature of the lamp holder 30, the lamp holder 30 is prevented from sustaining any thermal damage or degradation. Therefore, the electronic flash device is enabled to be operated for tens of minutes on end as is sometimes the case in a professional use without any problem.

As the concave mirror 42 is kept in contact with the xenon discharge flash tube 40 for the purpose of using the concave mirror 42 as a trigger electrode for the xenon discharge flash tube 40, the heat generated from the xenon discharge flash tube 40 is effectively transferred to the lamp holder 30. However, as the lamp holder 30 is made of ceramic material, no problem arises. As the concave mirror 42 is made of metal and has a significant surface area, the heat transferred thereto is effectively dissipated. This is particularly advantageous when the capacity of the xenon discharge flash tube 40 is great.

Because the lower edge 42C of the concave mirror 42 is adjacent to the guide rods 26 and the lead screw rod 34, there would be a risk of short-circuiting if the guide rods 26 and the lead screw rod 34 were made of metallic material. However, according to the illustrated embodiment, because the lead screw rod 34 is made of plastic material and the guide rods 26 are made of ceramic material, there is no risk of short-circuiting. Because both the guide rods 26 and the sleeves 30A of the lamp holder 30 are made of ceramic material, the sliding surfaces thereof do not wear out even after a prolonged use so that the durability of the electronic flash device is increased.

Also, the fresnel lens 24 is made of glass, and this prevents the thermal damage and degradation of the fresnel lens 24. Because the xenon discharge flash tube 40 is essentially made of quartz glass, the durability of the xenon discharge flash tube 40 is ensured even under the most severe conditions. The use of the crimping of a copper tube for the connection between the discharge electrodes of the xenon discharge flash tube 40 and the discharge electrode lead wires 46, and the connection between the trigger electrode terminal 50 and the trigger lead wire 52 increases the thermal resistance of these parts, as compared with soldering, so that the maximum permissible number of consecutive lighting of the xenon discharge flash tube 40 can be increased.

In the illustrated embodiment, the lamp holder 30 is moved in the fore and aft direction by using an electric motor 32 which is in turn controlled by an electronic circuit not shown in the drawings. However, it is also possible to arrange such that the lamp holder 30 is moved manually by the user. The light emitting part (the front shield plate 16) was rectangular in the illustrated embodiment, but may also be provided with a circular or any other desired shape.

The guide rods used in the foregoing embodiment were made of ceramic material, but may also be made of heat resistance plastic material such as such as heat-resistant polyamide resin, heat resistant epoxy resin, heat resistant polyamide-imide resin, heat resistant polyetheretherketone resin and potassium titanate fiber reinforced plastics or even be made of metallic material without departing from the spirit of the present invention. Also, the guide rods may be replaced by any guide structure such as rails, slots, bars and cables without departing from the spirit of the present invention.

The present invention was described in terms of a specific embodiment, but the present invention is not limited by the illustrated embodiments, and can be changed in various parts thereof. The contents of the prior art references mentioned in this application are incorporated in this application by reference.

The invention claimed is:

1. An electronic flash device, comprising;
a housing having a front opening;
a lens fitted in the front opening of the housing;
a guide member extending in a fore and aft direction in the housing;
a lamp holder guided by the guide member for a fore and aft movement;
an actuating mechanism for moving the lamp holder in the fore and aft direction along the guide member;
a flash tube supported by the lamp holder; and
a concave mirror mounted on the lamp holder to reflect flash light emitted from the flash tube and pass light reflected thereby through the lens;
wherein the lamp holder is made of ceramic material,
wherein the flash tube is supported by the lamp holder via a tube mounting member which includes a wavy central part extending laterally along a back side of the lamp holder and a pair of annular parts fitted on either axial end of the flash tube such that the flash tube is resiliently urged against a bottom part of the concave mirror.

2. The electronic flash device according to claim 1, wherein the flash tube consists of a xenon discharge flash tube, and the concave mirror is made of metallic material, the concave mirror being configured as a trigger electrode for the xenon discharge flash tube.

3. The electronic flash device according to claim 1, wherein the guide member is made of electrically insulating material.

4. The electronic flash device according to claim 3, wherein the guide member is made of ceramic material.

5. The electronic flash device according to claim 1, wherein one of the annular parts is configured as a trigger electrode.

6. The electronic flash device according to claim 1, wherein the lens comprises a fresnel lens made of glass material.

* * * * *